United States Patent [19]
Ammann

[11] 3,820,123
[45] June 25, 1974

[54] LASER MICROFILM RECORDER
[75] Inventor: Stephen K. Ammann, Cupertino, Calif.
[73] Assignee: Quantor Corporation, Mountain View, Calif.
[22] Filed: Apr. 4, 1973
[21] Appl. No.: 347,752

[52] U.S. Cl. .................. 354/7, 340/378, 178/6.7, 178/7.4
[51] Int. Cl. .......................................... B41b 17/14
[58] Field of Search ............... 95/4.5; 340/324, 378; 178/6.7, 7.4

[56] References Cited
UNITED STATES PATENTS

| | | | |
|---|---|---|---|
| 2,364,188 | 12/1944 | Bryce | 95/4.5 |
| 3,273,476 | 9/1966 | Haynes | 95/4.5 |
| 3,450,014 | 6/1969 | Astley | 95/4.5 |
| 3,585,296 | 6/1971 | Martin | 95/4.5 |
| 3,618,487 | 11/1971 | Tiefenthal | 95/4.5 |
| 3,636,837 | 1/1972 | McNaney | 95/4.5 |
| 3,653,067 | 3/1972 | Anderson | 95/4.5 |

Primary Examiner—John M. Horan
Attorney, Agent, or Firm—Townsend and Townsend

[57] ABSTRACT

An optical printer system for producing microfilm hard copy from information signals presented at a high data rate. An entire frame of information is printed line-by-line, each line being recorded character-by-character, each character being recorded column-by-column from a potential M-by-N matrix array by sweeping a column of M selectively actuated narrow beams of coherent light derived from a single laser source transversely of the film and successively repositioning the column in the longitudinal direction. A transverse position detector provides precise positioning signals for initiating generation of successive characters so that each character is precisely positioned on the film within an accuracy of the width of a single beam column space. A form image is projected onto the film at the end of a complete frame of characters. The accuracy of character positioning provided by the system ensures character alignment with the form image. The intensity of the character formation beams permits the use of dry process photographic film.

11 Claims, 5 Drawing Figures

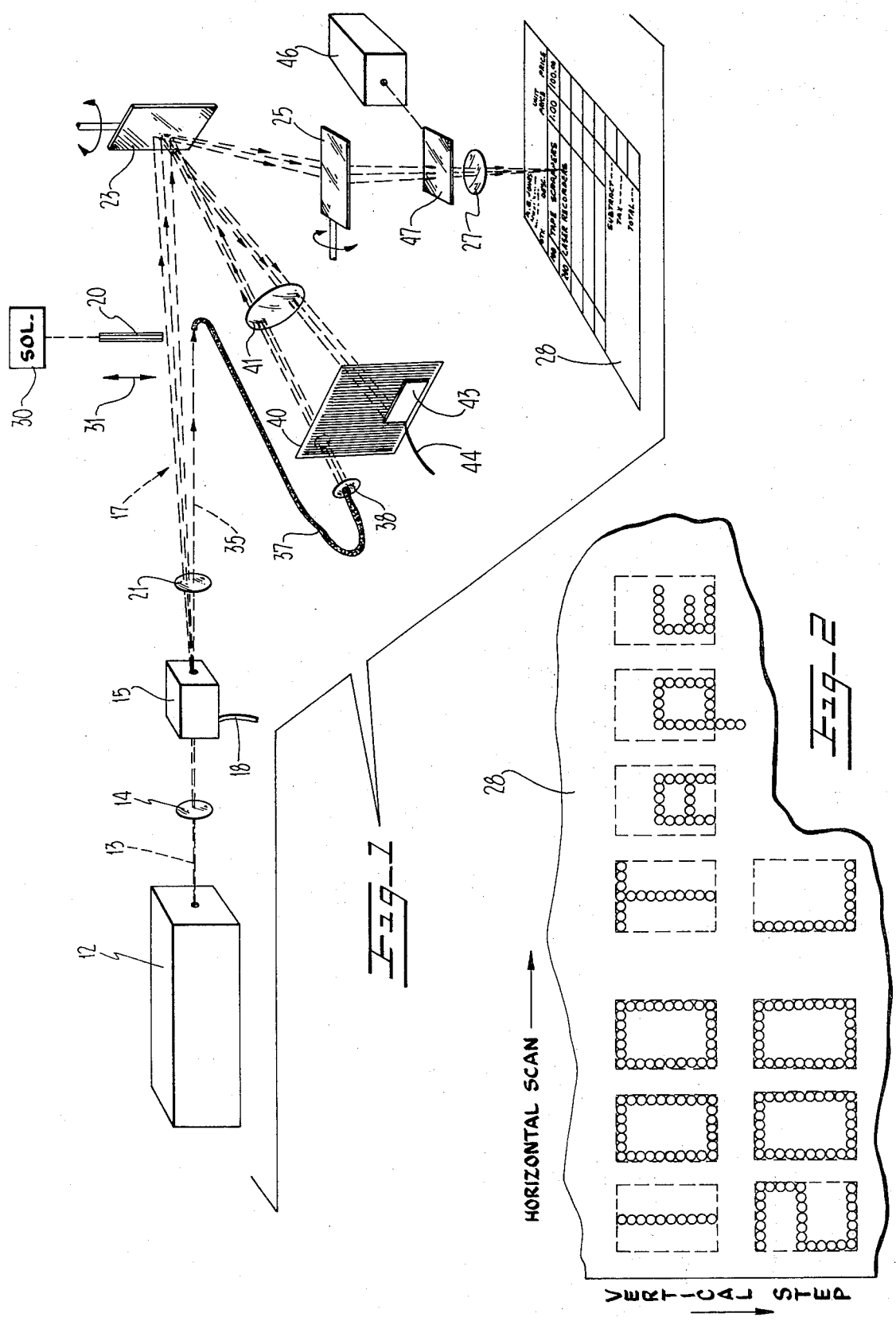

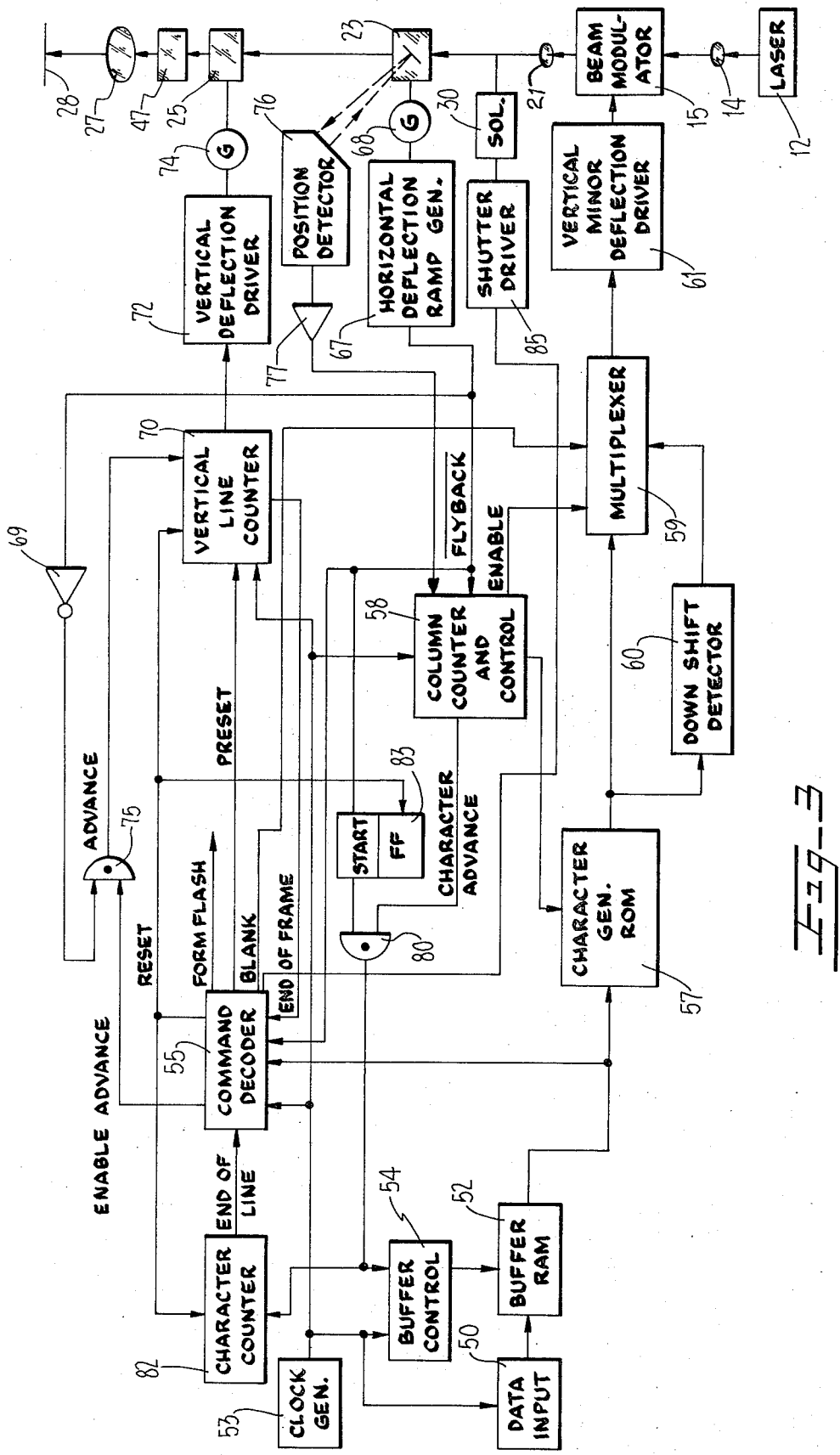

LASER MICROFILM RECORDER

BACKGROUND OF THE INVENTION

1. Field of the Invention

This invention relates to optical printers. More particularly, this invention relates to optical printers for producing microfilm recordings of information supplied by relatively high speed information handling devices, such as the output portion of a digital computer.

2. Description of the Prior Art

In the field of information handling it is frequently desirable to store information supplied at a relatively high data rate in permanent visible form. With the burgeoning volume of information to be recorded, it has been found most desirable to store such information in microfilm form.

High speed line printers and optical printers of diverse designs, e.g., have been employed in the past to provide permanent records, termed "hard copy," of data supplied by such high data rate devices as digital computers. Line printers suffer from the disadvantage, however, of having a relatively slow maximum operating rate compared to the rate at which information can be supplied by existing information handling devices. In addition, mechanical line printers are not readily adaptable to the recording of data in microfilm format. Consequently, the amount of space required to store hard copy produced by line printers is undesirably large compared to the space required for the same amount of information stored on microfilm.

Known optical printers are capable of functioning at a rate comparable to the operating rate of information source devices, but are subject to undesirable limitations. A major disadvantage of known optical printers is the requirement that only wet process photographic film can be used as a recording medium for satisfactory high speed information recording. Wet process photographic film requires a developing station which employs liquid developer chemicals. Known liquid developing stations occupy a relatively large amount of space which would not otherwise be required in an optical printer. Liquid developer chemicals used in such developing stations are inconvenient, and sometimes dangerous, to handle. Since the developing process consumes large quantities of liquid developer, these chemicals must be replenished at frequent intervals. Whenever liquid developer is being replenished, however, printer operation must ordinarily be suspended. As a result, optical printers require an inordinately large amount of down time, which reduces the efficiency and practability of such devices.

In an increasing number of applications, the requirement exists that data be recorded on microfilm in a predetermined form, such as an accident report form, a medical exam form, a standard business invoice, or the like. The microfilm recording process is normally a two step process: one step entails the recording of the form itself; the other, the recording of the specific data. The form is recorded by projecting a light image of a form slide onto the film; the data is recorded by projecting light images of the various data characters onto the film at the proper locations. Given the high rate with which data is supplied to the printer and the small physical dimensions of a microfilm frame, the problem of character misalignment with the form becomes acute. This problem is compounded by the fact that a standard information handling format has evolved in which the entire set of data characters is normally presented in serial fashion first, after which a form flash command character is used to project the form image onto the microfilm. Known optical printers are incapable of positioning the images of the data characters onto the microfilm with the degree of precision required to avoid misalignment of the characters on the later to be projected form. As a result, recorded data is frequently difficult to interpret. In extreme cases, such data is irretrievably lost.

SUMMARY OF THE INVENTION

The invention disclosed herein comprises an optical printer having sufficient character intensity to permit the use of dry process photographic film and a degree of precision in character image positioning hitherto unobtainable with known devices. In the preferred embodiment, characters are formed by selectively focusing one or more beams of coherent light radiation derived from a single laser beam onto a photosensitive film at an initial transverse reference position and sweeping the beams transversely of the film. Each character is formed from a potential M row by N column dot matrix array by selectively generating up to M narrow beams of coherent light arranged in a column in accordance with the desired character shape while sweeping the light beams transversely of the film a distance of N columns. A position detector provides a signal referencing the precise position of the column, which is used to initiate the generation of each succeeding character. Each character is thus precisely positioned with respect to the preceding character in a line. Means are provided for resetting the transverse position of the column to the initial transverse reference position after an entire line of characters has been generated, the repositioning accuracy being within the width of a column space, and for stepping the beam longitudinally of the film to a successive line position. An entire field of characters is thus recorded line-by-line, each line being recorded character-by-character, and each character being recorded column-by-column. After completion of an entire information frame, a form image is projected onto the film thereby completing the frame.

In the preferred embodiment, the optical printer system includes a buffer random access memory for receiving incoming data characters and command characters. Command characters are decoded by a command decoder, the output of which controls the operation of various units of the printer system. Data characters at the output of the buffer RAM condition the output of a character read only memory, which is clocked by a column counter. The output of the character ROM controls a multiplexer which drives an acousto-optic modulator. The modulator controls beam generation in accordance with the character information.

The column of light beams is swept transversely of the film by a mirror galvanometer under the control of a continuously operated horizontal ramp generator. The column of light beams is positioned longitudinally of the film by a second mirror galvanometer under the control of a vertical deflection driver. The vertical deflection driver is controlled by the output of a vertical line counter which is incremented at the termination of each complete line and reset at the beginning of a frame.

The transverse position detector comprises a grating illuminated from behind by a light source in order to project an image of a portion of the grating onto the transverse sweep mirror, a photocell positioned behind the grating to receive the reflected grating image through a different portion of the grating, and an amplifier for providing a square wave output signal having sharply defined edges from the sinusoidal output of the photocell.

For a fuller understanding of the nature and advantages of the invention, reference should be had to the following detailed description taken in conjunction with the accompanying drawings.

DESCRIPTION OF THE DRAWINGS

FIG. 1 is a schematic view in perspective of the preferred embodiment;

FIG. 2 is an enlarged view of a portion of microfilm illustrating character information;

FIG. 3 is a schematic diagram of the electronic circuitry employed in the preferred embodiment;

DESCRIPTION OF THE PREFERRED EMBODIMENT

Figure 4:
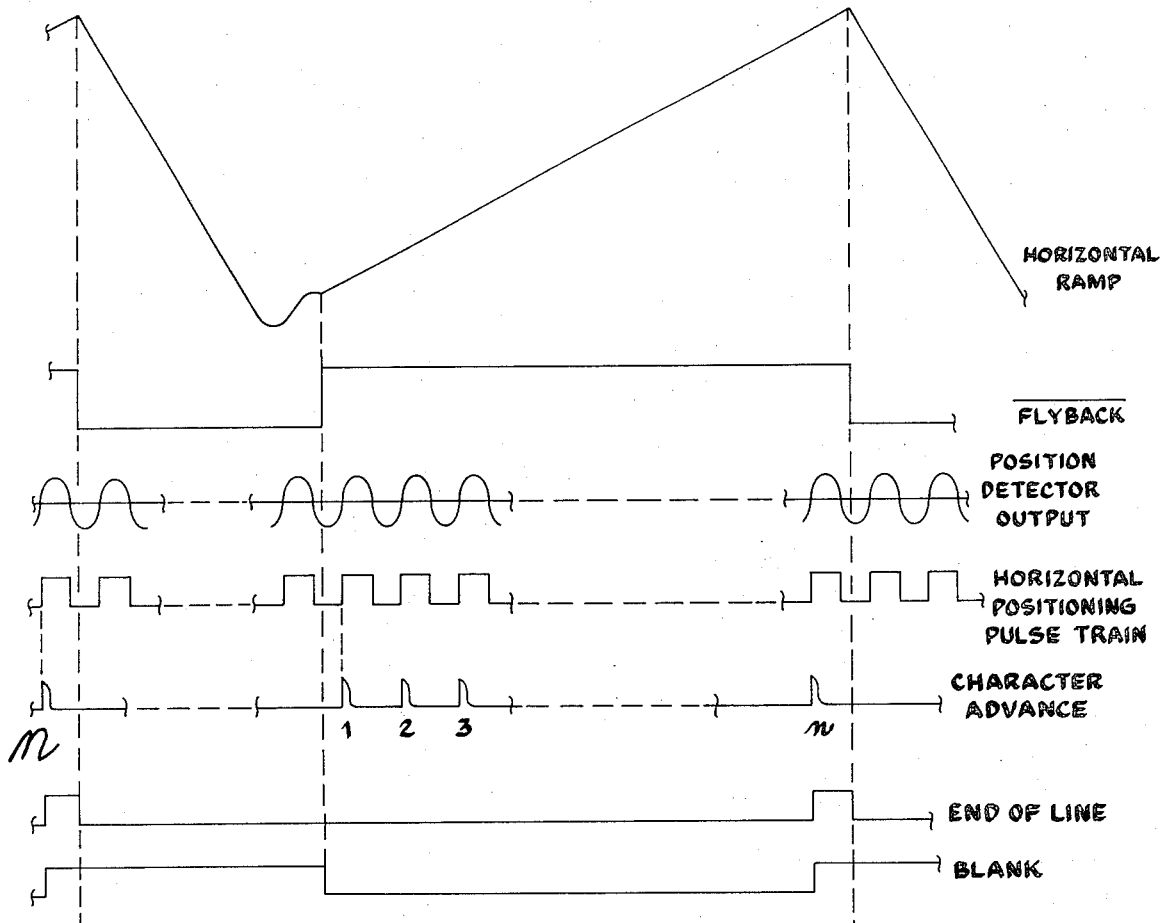
FIG. 4 is a wave form diagram serving to illustrate the operation of the preferred embodiment.

Turning now to the drawings, in FIG. 1 a single laser source 12, preferably a helium neon laser, produces a continuous single beam 13 of coherent light radiation. The laser beam is transmitted through a beam expander 14, which expands the diameter of the beam to a width required to provide an acceptable beam input to an acousto-optic modulator 15. In the preferred embodiment, beam expander 14 comprises a negative lens to expand the beam diameter and a positive lens to collimate the beam before transmission to the light input end of modulator 15.

Acousto-optic modulator 15 generates a plurality of coherent light beams indicated generally at 17 from the single beam input in accordance with character data signals supplied to a signal input 18. The character data signals are obtained from the electronic control portion of the system illustrated in FIG. 3 and selectively control the generation of individual ones of the plurality of output light beams 17. In the preferred embodiment, modulator 15 comprises a model M40-R acousto-optic light modulator manufactured by the Zenith Radio Corporation.

As will be evident to those skilled in the art, whenever a character data signal corresponding to a given one of the beams is present at signal input 18, that beam is generated at the output of modulator 15. In the absence of such a data signal, the beam is not generated.

Each beam is focused to a narrow spot at a focal plane 20 by a lens 21. All beams are equi-angularly spaced and the spots at focal plane 20 are aligned in a column.

The plurality of beams are transmitted to a beam sweeping mirror 23 operated in a manner to be described, and reflected by mirror 23 to a beam positioning mirror 25 also operated in the manner described below. After reflection from mirror 25, the beams are focused by a lens 27 onto the plane of photosensitive film 28. Beam sweeping mirror 23 provides a transverse sweep of the beams across the plane of the film and is operated in a continuous manner; mirror 25 provides a longitudinal positioning of the beams and is operated in a stepped fashion. In the preferred embodiment, mirrors 23, 25 and the control units for providing mirror motion respectively comprise a model G-0606 and model G-108 mirror galvanometer manufactured by General Scanning Inc., of Watertown, Mass.

A solenoid actuated high speed shutter assembly 30 is provided for interrupting the transmission of the light beams beyond focal plane 20 at appropriate intervals as described below in conjunction with the discussion of FIG. 3. Shutter assembly 30 is arranged for reciprocable actuation in opposite directions as indicated by arrow 31 and in the unactuated state is positioned to block transmission of light.

A single beam 35 from modulator 15 is collected by a fibre optics bundle 37 and transmitted to a lens 38 for use in illuminating a portion of one side of a grating 40. Beam 35 is an undeflected beam which is continuously transmitted by modulator 15 whenever laser 12 is operating. The light image of the illuminated portion of grating 40 is transmitted by a lens 41 onto the surface of transverse sweep mirror 23. The reflected light from mirror 23 is transmitted through lens 41 and focused onto a different portion of grating 40. A photosensor 43, the output 44 of which is coupled to an amplifier 77 is shown in FIG. 3, receives light transmitted through grating 40. Thus, as mirror 23 is rotated the reflected grating image is swept across the grating, causing the output of photosensor 43 to vary in a periodic manner. In the preferred embodiment, a grating having a grating width of 25 microns and a spacing between corresponding edges of adjacent gratings of 50 microns was found to provide excellent results.

A form slide projector 46 is positioned adjacent vertical beam position mirror 25. Projector 46 may be any suitable light projection device known to those skilled in the art which is capable of projecting an image of a form slide onto a beam combing element 47 in response to the generation of a form flash command signal by the circuitry shown in FIG. 3. Beam combining element 47 may comprise a dichroic of a half-silvered mirror, or the like, and is transmittively interposed in the path of the beam column and reflectively interposed in the path of the form image in such a manner as to permit projection of both onto the plane of film 28.

The operation of the FIG. 1 device proceeds as follows. With the single laser beam 13 applied to the light input of modulator 15 and successive character data signals applied to the signal input of modulator 15, various ones of the individual beams 17 are generated and transmitted as a column via lens 21, mirrors 23,25 beam combiner 47 and lens 27, to the plane of film 28. As mirror 23 is rotated, the beams are swept transversely of film 28. The combination of the transverse sweep afforded by mirror 23 and the selective beam actuation provided by modulator 15 causes the film to be exposed along a transverse character line in such a manner as to develop the specified data characters.

As mirror 23 sweeps the beams transversely of film 28 the grating image reflected from moving mirror 23 is swept across grating 40, causing the output of photosensor 43 to vary periodically. As discussed more fully below, this periodic output signal is amplified and shaped to provide character initiation signals which enable the generation of successive character data signals. When the beam column reaches a predetermined limiting position at the end of a line, mirror 23 is rapidly reversed to the initial transverse reference position and all beams 17 are simultaneously extinguished. During flyback, vertical positioning mirror 25 is also stepped a predetermined amount to position the beam column at the next succeeding character line position. Thereafter, regular sweep motion of mirror 23 is reinitiated, along with selective beam generation to develop the next succeeding line of characters. This mode of operation continues until film 28 has been exposed to all character lines of a given frame of information. Thereafter, projector 46 is actuated by an appropriate control signal, causing the selected form image to be projected onto the plane of film 28. With the microfilm frame now completed, mirror 25 is ready to be reset to the starting position for the initiation of exposure of the next succeeding frame. After exposure of one or more frames, film 28 id developed using conventional development techniques.

The manner in which characters are formed is illustrated in detail in FIG. 2, which shows a greatly enlarged portion of a developed microfilm frame. Each character in a given line is formed from a potential 10 row by 7 column matrix by exposing successive column areas of film 28 from left to right in accordance with the character data signals. Thus, the letter "T," e.g., is formed by generating the uppermost beam for the first three column positions, 10 beams for the median column position, and the uppermost beam for the last three column positions.

For those characters having tails which lie below the bottom matrix row, a special down shift detector circuit 60 (see FIG. 3) enables the generation of a maximum of three additional beams below this row. This technique is also employed to expose an underline. Thus, the tail of the letter "P" of the word "tape" in FIG. 2 is formed by generating three additional beams below the lowest row of the 10 × 7 matrix for one column position. As will be appreciated by those skilled in the art, other size character matrices may be employed as desired.

Each potential character matrix is uniformly and precisely spaced from the preceeding character matrix by a distance equal to 3 column positions. The manner in which this spacing is achieved is described below in detail with reference to FIG. 3. In the preferred embodiment a complete line has a maximum of 132 characters, a complete frame has a maximum of 65 lines.

FIG. 3 illustrates the schematic diagram of the electronic portion of the preferred embodiment. Data from a data input device 50, which may comprise a conventional computer, a magnetic tape unit, a disc file unit or the like is input to a buffer random access memory 52 under control of a clock generator 53 and a buffer control unit 54. Buffer RAM 52 may comprise a full page buffer having a capacity sufficient to store a complete microfilm frame of information. Alternatively, buffer RAM 52 may have a smaller capacity, the practical minimum being a buffer having a capacity of about three lines of information.

Command characters from buffer RAM 52 are sensed by a command decoder 55 which develops control signals for directing the operation of various units of the system as described below. Data characters from buffer RAM 52 are presented to a character generator read only memory 57 which is configured in a known way to provide the desired system character font in the form of 10 beam-specifying output signals generated in parallel. The output of character generator ROM 57 is controlled by a column counter and control unit 58 which sequentially selects each column of a given character in character generator ROM 57 specified by the data character present at the input thereto. The output of character generator ROM is coupled to a multiplexer 59, preferably a Texas Instruments SN 74153, which normally couples the input signals to 10 parallel output lines, whenever an ENABLE signal is generated by column counter and control unit 58 in the manner noted below.

The output of character generator ROM 57 is also coupled to a down shift detector 60. Detector 60 is a character recognition unit which produces a downshift command signal at the output thereof whenever signals representing a character having a portion lying below the bottom row of the 10 × 7 character matrix are present at the input thereto. In the preferred embodiment, such a character is identified by a zero bit in the last bit position of a data character. If desired, other equivalent identification techniques known to those skilled in the art may be employed for this purpose. Whenever such a character causes down shift detector 60 to produce a down shift command, multiplexer 59 shifts the signals input thereto down by three rows so that an output signal on the lead corresponding to the uppermost beam appears on the fourth beam lead from the top, an output signal on the lead corresponding to the lowermost beam appears on a lead corresponding to the lowermost beam appears on a lead corresponding to a beam position three rows below the normal bottom row of the character matrix, and the signals present on the remaining output leads are downshifted accordingly by three rows.

Figure 5:
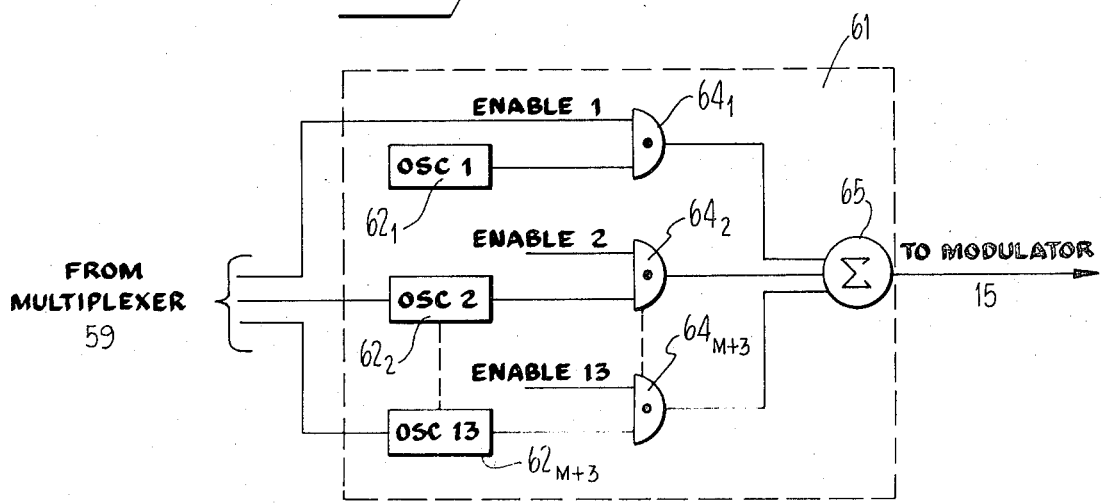
FIG. 5 is a schematic diagram of the multiplexer shown in FIG. 3.

The ten parallel output signals from multiplexer 59 are coupled to the several inputs of a vertical minor deflection driver 61. With reference to FIG. 5, driver 61 comprises M + 3 oscillators $62_1$–$62_{M+3}$ each having an output coupled to a first input of a different linear AND gate $64_1$–$64_{M+3}$. The remaining input of each of linear AND gates $64_1$–$64_{M+3}$ is obtained from a different one of the M+3 parallel signal output leads from multiplexer 59. The output signals from each of linear AND gates $64_1$–$64_{M+3}$ are summed in a linear summing network 65 and coupled to the control signal input 18 of acousto-optic modulator 15.

In the preferred embodiment, oscillators $62_1$–$62_{M+3}$ comprise 13 continuously operating stable high frequency oscillators (since $M=10$), each of which generates a highly stable periodic signal of a specific different frequency. The frequencies of the several oscillators are as follows:

| Oscillator | Frequency |
| --- | --- |
| 1 | 31.90 Mhz |
| 2 | 33.25 |
| 3 | 34.60 |
| 4 | 35.95 |
| 5 | 37.30 |
| 6 | 38.65 |
| 7 | 40.00 |
| 8 | 41.35 |
| 9 | 42.70 |
| 10 | 44.05 |
| 11 | 45.40 |
| 12 | 46.75 |
| 13 | 48.10 |

Thus, whenever particular ones of linear AND gates $64_1$–$64_{M+3}$ are enabled by a signal from the corresponding output of multiplexer 59, control signals having the individual frequencies of the corresponding oscillators $62_1$–$\beta_{M+3}$ are transmitted therethrough, linearly summed and applied to the control signal input 18 of modulator 15. As will be evident to those skilled in the art, the application of a control signal of a particular frequency to the control signal of input 18 of modulator 15 results in the generation of a specific light beam at the output thereof. When a compound control signal having signals of more than one frequency are applied thereto, those beams corresponding to the particular frequencies are generated. In this manner, beam generation is controlled by the data character information contained in buffer RAM 52.

Deflection of the light beam column in the transverse direction of film 28 is controlled by a free-running horizontal ramp generator 67 which drives the deflection coil of the transverse sweep mirror galvanometer 68. In the preferred embodiment, horizontal ramp generator 67 produces a periodic saw tooth output signal illustrated in FIG. 4 having a period of three milliseconds. Each cycle of the horizontal ramp signal comprises an initial flyback portion of 1 millisecond duration and a sweep portion of 2 milliseconds duration. During flyback, transverse sweep mirror 23 is rotated from the extreme right hand line position as viewed in FIG. 1 to the initial transverse reference position. During sweep, mirror 23 is rotated from the initial transverse reference position to the extreme right hand line position.

Horizontal ramp generator 67 also includes circuitry for generating a $\overline{\text{FLYBACK}}$ signal also illustrated in FIG. 4. This signal transitions sharply from the true level to the false level at the beginning of the flyback portion of the horizontal ramp signal and transitions sharply from the false level to the true level 1 millisecond later. Circuitry for producing such a signal is conventional and accordingly has not been illustrated in detail. One such circuit comprises a positive-to-negative slope detector having an output coupled to a monostable multivibrator with a timeout period of one millisecond. Other equivalent circuits known to those skilled in the art may be employed as desired.

The longitudinal position of the light beam column relative to film 28 is controlled by the setting of a vertical line counter 70. In the preferred embodiment, vertical line counter 70 is a Texas Instruments SN 74193 integrated circuit connected as a scale of 64 counter provided with both internal and external reset and presettable to any desired starting count. An external reset signal is obtained from the output of command decoder 55. This signal is generated whenever a command character specifying the beginning of a frame is sensed by command decoder 55. Whenever the external reset signal is generated, vertical line counter 70 is reset to a predetermined initial count. The count in vertical line counter 70 is converted into an analog signal voltage by a vertical deflection driver 72, which in the preferred embodiment is a model DAC 10Z3 digital-to-analog converter manufactured by Analog Devices of Norwood, Mass. The output of driver 72 drives the deflection coil of the vertical positioning mirror galvanometer 74. Thus for each different setting of vertical line counter 70, vertical positioning mirror 25 is held in a different predetermined angular position.

Vertical line counter 70 is incremented by an ADVANCE signal obtained from an AND gate 75. AND gate 75 is conditioned by an ENABLE ADVANCE signal obtained from command decoder 55. This signal is generated whenever an END OF LINE signal illustrated in FIG. 4 is generated by a character counter 82, described below, and sensed by command decoder 55. The ADVANCE signal is generated at the beginning of beam flyback from the negative going transition of the $\overline{\text{FLYBACK}}$ signal from horizontal ramp generator 67, inverted to a positive-going signal by an inverter 69. Thus, vertical line counter 70 is incremented once for each complete transverse sweep of the beam column. After vertical line counter has been incremented to a full count of 64, the next succeeding ADVANCE signal causes vertical line counter 70 to be reset to the initial count setting due to the internal reset feature.

Whenever a command character specifying the beginning of the printing of a frame at other than the upper most line is sensed by command decoder 55, an individual PRESET signal indicating the desired starting line is generated by command decoder 55 and applied to the preset input of vertical line counter 70. In such a case, counter 70 is preset to the specified line number and vertical positioning mirror 25 is immediately rotated to the corresponding angular position.

The horizontal positioning circuit, which is used to control the initiation of the generation of each particular character, includes a horizontal position detector 76. Detector 76, which comprises the elements noted above with reference to the description of FIG. 1, supplies a periodic signal shown in FIG. 4 to the input of an amplifier 77. Amplifier 77 provides a horizontal positioning pulse output signal also illustrated in FIG. 4 to the input of column counter and control unit 58. The remaining control input signal to unit 58 is the $\overline{\text{FLYBACK}}$ signal from horizontal ramp generator 67.

The horizontal positioning pulse signal is a substantially square wave pulse train having a sharp transition at each of the zero crossing points of the output signal from horizontal positioning detector 76. Each positive going transition of this signal which occurs during the sweep portion of the horizontal ramp signal (i.e. when $\overline{\text{FLYBACK}}$ is true) is used to enable column counter and control unit 58 to initiate generation of a character. Once enabled, column counter and control unit 58 is independently clocked by clock generator 53 at the fixed rate of 0.825 mHz. Each clock pulse from generator 53 increments the counter portion of unit 58, which in the preferred embodiment is a Texas Instruments SN 74193 integrated circuit connected as a scale of 8 counter. The counter setting is decoded and coupled to character ROM 57. Each successive count of this counter enables the output of a correspondingly successive column of the character corresponding to the data character supplied by buffer RAM 52. In addition, successive ENABLE signals are generated for a predetermined portion of each successive count to enable multiplexer 59 to transmit the parallel output signals from character ROM 57 to vertical minor deflection driver 61. In the preferred embodiment the duration of each ENABLE signal is substantially 50 percent of the count period. After the last column of an individual character has been selected, the counter portion of unit 58 generates a CHARACTER ADVANCE signal which is coupled via an AND gate 80 to buffer control unit 54 and a character counter 82. Receipt of a CHARACTER ADVANCE signal by buffer control unit 54 enables the next succeeding character in buffer RAM 52 to be clocked to the output thereof by clock generator 53. The appearance of a CHARACTER ADVANCE signal at the input of character counter 82 causes this unit to be incremented.

Character counter 82 is a scale of 132 counter and is used to generate a signal indicating that the last character in a line has been printed. This END OF LINE signal is coupled to command decoder 55 which generates an ENABLE ADVANCE signal for enabling AND gate 75 in the manner noted above. When AND gate 75 is enabled the negative going transition of $\overline{\text{FLYBACK}}$ causes vertical line counter 70 to be incremented and vertical positioning mirror 25 is accordingly stepped to the next succeeding line position by the changed output of vertical deflection driver 72. The END OF LINE signal is also generated by the reset signal from command decoder 55 which is produced at the beginning of a frame of information.

The END OF LINE signal also causes command decoder 55 to generate a BLANK signal which disables multiplexer 59 until $\overline{\text{FLYBACK}}$ signal transitions true, i.e. for the duration of beam flyback. The application of BLANK signal to multiplexer 59 causes each of the column beams 17 to be extinguished during flyback in order to prevent exposure of film 28 during this portion of the print cycle.

In order to synchronize the start of printing of a frame of information with the beginning of a transverse sweep of mirror 23, a START flip flop 83 is provided which is reset at the start of a frame of information by the RESET signal generated by command decoder 55 in response to the first information character. After reset of START flip flop 83, the next positive transition of $\overline{\text{FLYBACK}}$ sets flip flop 83. This enables AND gate 80 to transmit the CHARACTER ADVANCE signal from column counter and control unit 58 to buffer control unit 54. Upon receipt of the CHARACTER ADVANCE signal, buffer control unit 54 outputs the first data character to character generator ROM 57 and printing of the first data character can begin.

After the printing of the last line in a frame of information is completed, command decoder 55 generates a FORM FLASH command which is coupled to form slide projector 46 shown in FIG. 1. Receipt of the FORM FLASH command enables projector 46 to project an image of the predetermined form as noted above onto film 28, thereby completing the exposure of an entire frame of film 28. In the preferred embodiment the FORM FLASH command is generated in response to receipt of an END OF FRAME signal from vertical line counter 70. This signal is generated when vertical line counter 70 is internally reset at the end of a frame of information. If desired, the form flash command may be generated in an alternate fashion by including a special character at the end of a frame of information in the incoming data train.

It has been found desirable to provide the preferred embodiment with a means for interrupting the light path between lens 21 and mirror 23 whenever data is not present at the output of buffer RAM 52 for a substantial period of time. Accordingly, command decoder 55 is provided with a data character recognition circuit which generates an enabling signal for enabling shutter driver 85 to actuate shutter solenoid 30 whenever the output of buffer RAM 52 comprises a data character. In the absence of such an enabling signal, shutter driver unit 85 provides an output signal which permits shutter solenoid assembly 730 to remain in the normal light blocking position.

In operation, when the first command character from buffer RAM 52 is sensed by command decoder 55, this unit generates a reset signal which resets vertical line counter 70, character counter 82, and start flip flop 83. Reset of character counter 82 results in the generation of an END OF LINE signal, which in turn causes command decoder 55 to generate an ENABLE ADVANCE signal for conditioning one input of AND gate 75. Reset of start flip flop 83 prevents transmission of a CHARACTER ADVANCE signal to buffer control unit 54 until the first positive-going transition of $\overline{\text{FLYBACK}}$ signal, i.e. until the start of the first full sweep period.

When the first negative-going transition of $\overline{\text{FLYBACK}}$ signal appears, ADVANCE signal is generated by AND gate 75 and vertical line counter 70 is stepped off zero, causing vertical deflection driver 72 to position vertical positioning mirror 25 to the first line position, unless vertical line counter 70 has been preset to an advance count by a PRESET signal from command decoder 55. When the first positive-going transition of $\overline{\text{FLYBACK}}$ signal occurs thereafter, start flip flop 83 is set thereby conditioning AND gate 80 to transmit a CHARACTER ADVANCE signal to buffer control unit 54. Receipt of the CHARACTER ADVANCE signal by buffer control unit 54 enables this unit to permit the clocking by clock generator 53 of the first data character of the first data line of information to the output of buffer RAM 52. With the first data character input to character generator ROM 57, the coincidence of the $\overline{\text{FLYBACK}}$ signal and the leading edge of a horizontal positioning pulse enables column counter and control unit 58 to be independently clocked by clock generator 53, and the successive beam specifying column signals are applied to multiplexer 59 on a column-by-column basis. These signals are output by multiplexer 59 to vertical minor deflection driver 61 along the upper 10 lines thereof, unless a down shift character is detected by down shift detector 60. If a down shift character is detected by down shift detector 60, the signals are shifted down by 3 lines. The output signals from vertical minor deflection driver 61 modulate acoustooptic modulator 15 which transmits the appropriate beams therethrough.

Contemporaneously with the above operation, horizontal ramp generator 67 linearly sweeps mirror 23 in the transverse direction so that successive beam columns expose film 28 to the entire first character. After exposure of the first character, column counter and control unit 58 generates a CHARACTER ADVANCE signal which results in the transfer of the next data character in buffer RAM 52 to the output section thereof.

When the next positive-going transition of the horizontal position pulse train occurs, column counter and control unit 58 is again enabled (since $\overline{\text{FLYBACK}}$ is still true) for independent clocking by clock generator 53 and film 28 is accordingly exposed column-by-column to the second character of the first line. Successive characters are exposed in this manner until film 28 has been exposed to the last character in the first line and the resulting CHARACTER ADVANCE signal from column counter and control unit 58 has incremented character counter 82 to the full state.

Upon occurrance of this condition, the END OF LINE signal generated by character counter 82 causes command decoder 55 to generate an ENABLE ADVANCE signal, thereby conditioning AND gate 75. When the next negative-going transition of $\overline{\text{FLYBACK}}$ signal occurs, vertical line counter 70 is incremented by the resulting ADVANCE signal from AND gate 75, thereby causing vertical deflection driver 72 to position mirror 25 to the next line position. The negative transition of $\overline{\text{FLYBACK}}$ signal also causes command decoder 55 to generate a BLANK signal for disabling multiplexer 59 until the end of flyback. Contemporaneously, $\overline{\text{FLYBACK}}$ signal false at the input to column counter and control until 58 disables this unit from being clocked by clock generator 53.

After a positive transition of $\overline{\text{FLYBACK}}$ signal indicates the end of beam flyback, the BLANK signal from command decoder 55 to multiplexer 59 is removed and the concurrence of $\overline{\text{FLYBACK}}$ signal true with the next succeeding positive transition of the horizontal positioning pulse train enables column counter and control unit 58 to be clocked by clock generator 53, thereby initiating the exposure of film 28 to the first character of the second line of the frame. The remainder of the second line of the frame is exposed in the manner already described.

Operation of the system proceeds in the above manner until film 28 has been exposed to the last character of the last line of the frame. Thereafter, when vertical line counter 70 is incremented in response to the negative-going transition of $\overline{\text{FLYBACK}}$ signal and the resulting ADVANCE signal from the output of AND gate 75, an END OF FRAME signal is applied to command decoder 55 which generates a FORM FLASH signal. Appearance of the FORM FLASH signal causes form slide projector 46 (FIG. 1) to project the form slide image onto film 28 thereby completing the exposure process for one frame. Thereafter film 28 is advanced by means not shown until a fresh unexposed film frame is positioned in the image projection area. The system is now ready for the initiation of the exposure of film 28 to the subsequent frame of information. If desired, the previously exposed film frame may be developed contemporaneously with the exposure of the subsequent frame of information. Alternatively, the entire portfolio of information can first be exposed, after which the entire film 28 can be later developed.

During exposure of a single frame, whenever buffer RAM 52 contains a long string of characters which do not correspond to a data character, shutter driver unit 85 is disabled by command decoder 55. Correspondingly, shutter assembly 30 blocks the transmission of any light beyond focal plane 20 to avoid the possibility of exposure of film 28 by stray light.

The system described above affords several advantages over known prior art optical printing systems or mechanical line printing devices. Because each of the exposure beams constitutes a coherent light beam, the quantity of energy available for exposure of a dot portion of the film is substantially greater than that afforded by systems not employing a source of coherent radiation. As a result, dry process sensitive film such as dry silver film sold by Minnesota Mining and Manufacturing Co. may be employed with the system and excellent results obtained therewith. Because dry process film may be employed in the system, the necessity for the auxiliary apparatus normally required for the chemicals used with the wet process type of film can be omitted with a consequent saving in cost and operating space. A further advantage resides in the fact that the system can be operated at extremely high speeds at a rate compatible with the output from a conventional digital computer, a high speed magnetic tape unit or the like. In the preferred embodiment, for example, characters are exposed at the rate of $44 \times 10^3$ characters per second with excellent resolution. Other sweep rates may be employed as desired.

In addition to providing an extremely accurate positioning for each character in a line, the invention provides an extremely accurate positioning of the initial character of each line in a frame. This positioning accuracy is made possible by the horizontal position detector which enables repositioning of the beam column to within an error of less than the ratio of the diameter of one beam to the length of a line. Stated otherwise, the error in positioning of a horizontal line character is less than $1/L \times (N+S)$, where L equals the maximum number of characters in a line, N the number of columns in a character and S equals the number of column spaces between characters. Thus, in the preferred embodiment the positioning error is less than $1 \div 132 \times (7+3) = 1/1320$. Due to the accuracy of the character alignment in the transverse direction of the film in each line of characters, therefore, extreme precision placement of the individual data characters within a predetermined form format is achieved with systems constructed in accordance with the invention.

While the above provides a full and complete disclosure of the invention, it is understood that various modifications, alternate constructions and equivalents may be employed without departing from the true spirit and scope of the invention. Accordingly, the above description and illustrations should not be construed as limiting the scope of the invention, which is solely defined by the appended claims.

What is claimed is:

1. An optical printer system for projecting character images derived from character input information onto an exposure surface in the form of elemental character segments, said system comprising:
    means including a clock for specifying successive characters to be projected onto said surface at a rate determined by said clock;
    means coupled to said character specifying means for generating a plurality of segment forming beams of coherent radiation arranged substantially co-linearly;
    first projection means for sweeping said beams asynchronously relative to said clock along a line in a direction substantially transverse of the direction of co-linearity from an initial beam reference position;
    second projection means for positioning said beams in successive line positions in a direction substantially parallel to said direction of co-linearity;
    means for generating transverse position signals representative of the instantaneous position of said beam sweeping means; and
    means responsive to said transverse position signals for enabling said character specifying means to initiate projection of successive characters in a line at predetermined transverse positions spaced at substantially constant intervals from the initial portion of the preceding character in said line.

2. The system of claim 1, wherein said character specifying means comprises a buffer storage device for storing said characters, said buffer storage device having means for manifesting successive ones of said characters at the output thereof, buffer control means for controlling the character manifested at said output of said buffer storage device, a character memory for storing a font of characters, said character memory having an input coupled to the output of said buffer storage device and an output for manifesting successive groups of character sequence specifying signals for each said character, and means for generating sequential signals for controlling the manifestation of said groups of character sequence specifying signals at said output of said character memory.

3. The system of claim 2, wherein said character memory comprises a read only memory device.

4. The system of claim 1, wherein said first projection means comprises a moveable mirror positioned in the transmission path of said beams for controlling the deflection thereof and means for controlling the motion of said mirror in a periodic manner.

5. The system of claim 4, wherein said mirror control means includes a free running ramp signal generator for generating a regularly periodic saw tooth control signal.

6. The system of claim 1, wherein said second projection means comprises a second moveable mirror positioned in the transmission path of said beams, and means for controlling the position of said second mirror in an incremental manner.

7. The system of claim 6, wherein said second mirror control means includes a counter, means for incrementing said counter at the end of each said line, and a digital-to-analog converter coupled to said counter for converting the count held by said counter to a control signal having a different level for each said line position.

8. The system of claim 1, wherein said first projection means includes a mirror, and said means for generating transverse position signals comprises a grating, means for projecting an image of a portion of said grating towards said mirror, and photosensitive means positioned to receive the light reflected from said mirror and transmitted through said grating for generating a periodic wave form representative of the instantaneous position of said mirror.

9. The system of claim 1, wherein said beam generating means comprises an accousto-optic modulator, and means responsive to said character specifying means for generating signals for controlling said accousto-optic modulator.

10. The system of claim 1 further including projector means for projecting an image of a predetermined form onto said exposure surface, and means for actuating said projector means after the last character in the last line has been projected onto said surface.

11. In an optical printer system having means for generating a succession of light images of characters to be printed, means for projecting said images onto an exposure surface and means including a mirror for positioning successive ones of said images along a line on said exposure surface, the improvement comprising means responsive to the instantaneous position of said positioning means for generating character initiation signals for enabling the generation of each one of said succession of light images, said last-named means including a grating, means for projecting an image of a portion of said grating towards said mirror, and photosensitive means positioned to receive the light reflected from said mirror and transmitted through said grating for generating a periodic wave form representative of the instantaneous position of said mirror.

* * * * *